United States Patent [19]

Bailey et al.

[11] Patent Number: 5,382,169

[45] Date of Patent: Jan. 17, 1995

[54] ELECTRICAL CONNECTORS

[75] Inventors: William R. Bailey, Glen Ellyn; Antonio A. Garay, Norridge; Keith A. Rosborough, St. Charles, all of Ill.

[73] Assignee: Labinal Components and Systems, Inc., Elk Grove Village, Ill.

[21] Appl. No.: 182,641

[22] Filed: Jan. 14, 1994

[51] Int. Cl.$^6$ ............................................. H01R 9/09
[52] U.S. Cl. .......................................... 439/76; 439/66
[58] Field of Search ................ 439/66, 76, 91, 700, 439/824

[56] References Cited

U.S. PATENT DOCUMENTS

| | | | |
|---|---|---|---|
| 2,853,656 | 9/1958 | Dowds | 317/101 |
| 3,134,954 | 5/1964 | Braun | 338/66 |
| 4,029,375 | 6/1977 | Gabrielian | 339/17 |
| 4,471,339 | 9/1984 | Fukada et al. | 338/162 |
| 4,988,306 | 1/1991 | Hopfer, III et al. | 439/66 |
| 4,992,053 | 2/1991 | Lindeman et al. | 439/66 |
| 5,013,249 | 5/1991 | Lindeman et al. | 439/66 |
| 5,127,837 | 7/1992 | Shah et al. | 439/71 |
| 5,127,838 | 7/1992 | Zaderej et al. | 439/74 |
| 5,282,111 | 1/1994 | Hopfer | 361/704 |

OTHER PUBLICATIONS

Color photocopies of three photographs of an automotive engine connector device or ignition module.

Primary Examiner—Neil Abrams
Attorney, Agent, or Firm—Leydig, Voit & Mayer, Ltd.

[57] ABSTRACT

Electrical connector devices are provided for interconnecting external conductors with a connecting member such as a circuit which has upwardly projecting components that are adjacent contact areas on an exposed surface. The connector device comprises an insulator body for supporting a plurality of conductor elements in spaced relation to one another. The insulator body includes a plurality of cantilever hollow projections which have a length that exceeds the height of the components above the contact surfaces. The projections extend from the conductor sites generally parallel to one another and are disposed to mate the contact surfaces while providing spaces therearound to receive and accommodate the components. The insulator body preferably is a unitary molded body which includes the projections. An axially compressible conductive means extends through each of the hollow projections from the respective conductor site to an exposed end at the distal end of the respective projection. Preferably each compressible conductive means includes a wadded wire contact button and an exposed end plunger.

26 Claims, 4 Drawing Sheets

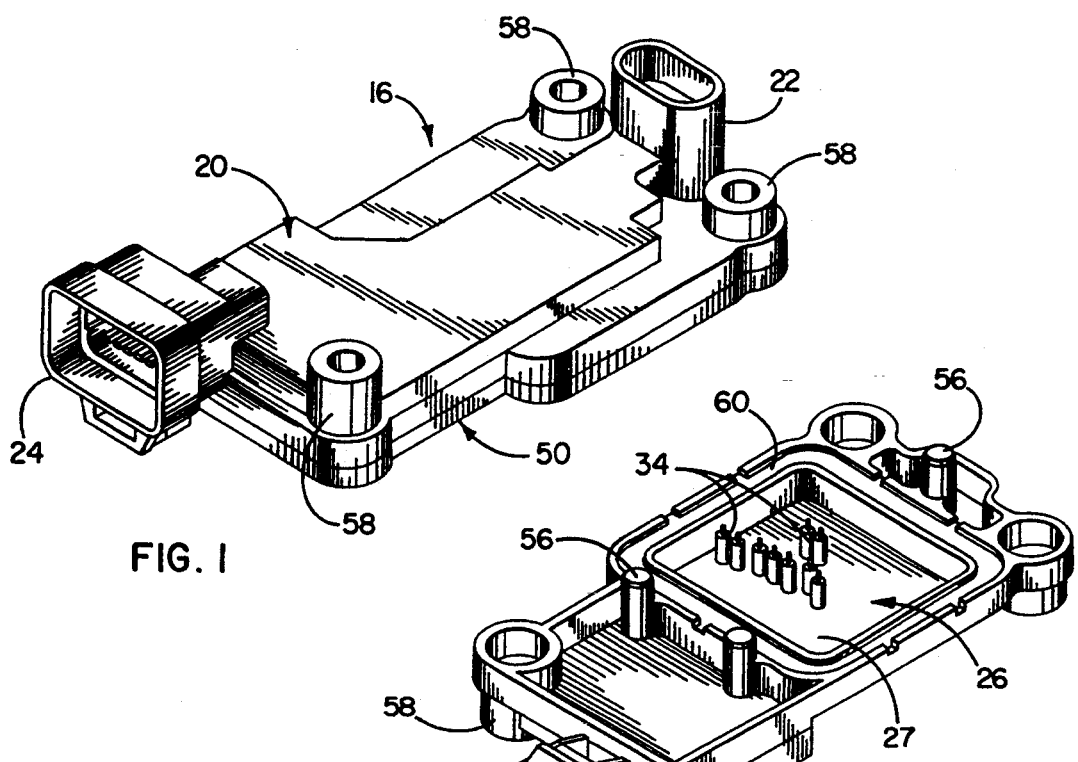
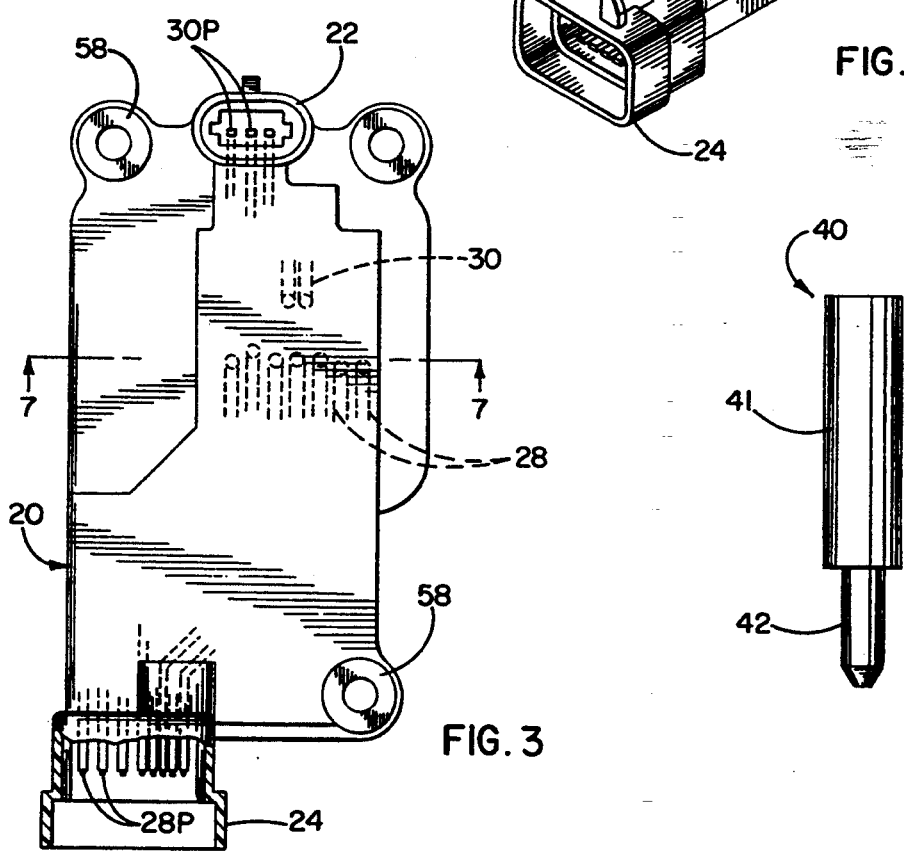
FIG. 1
FIG. 2
FIG. 3
FIG. 11

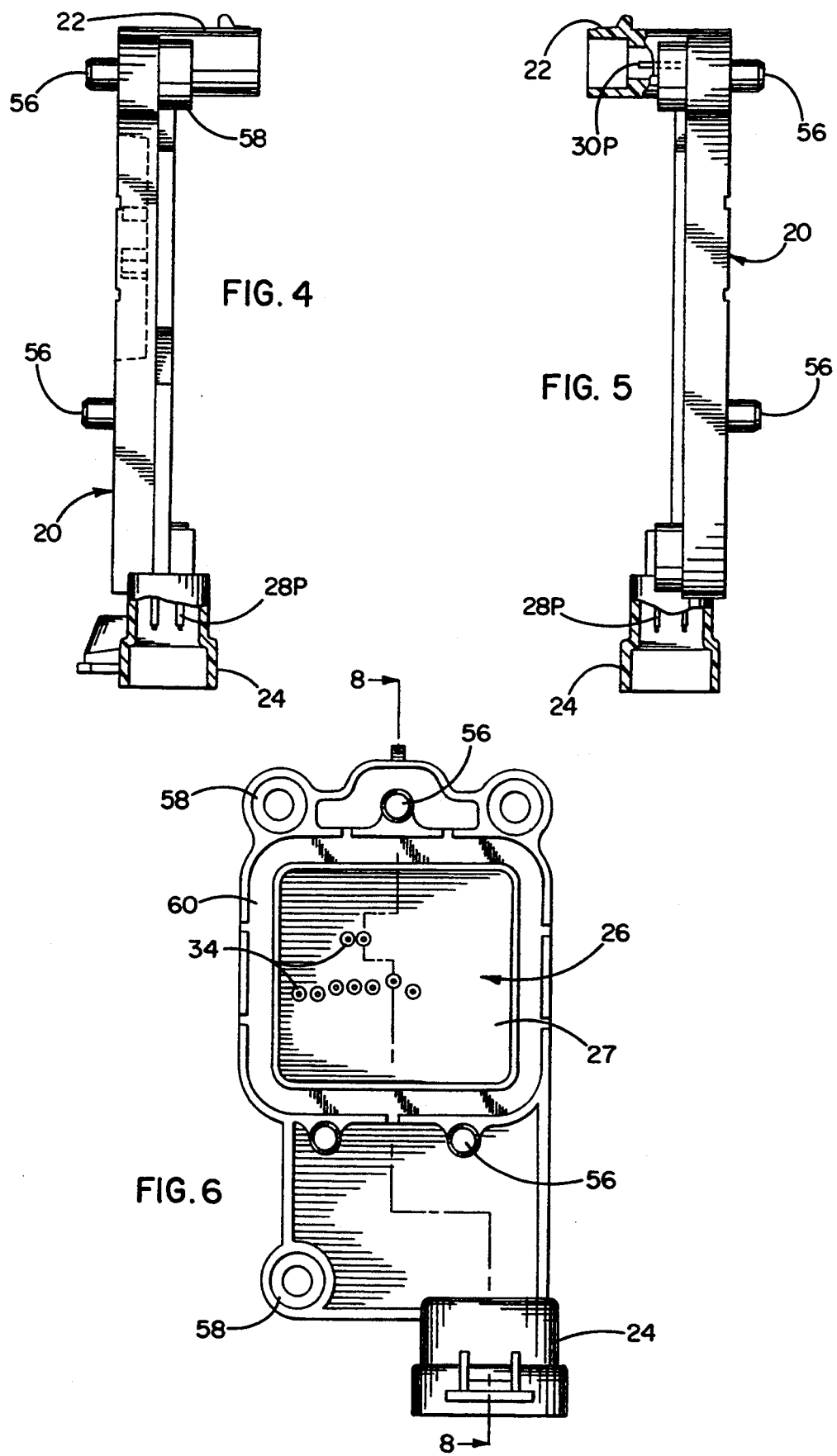

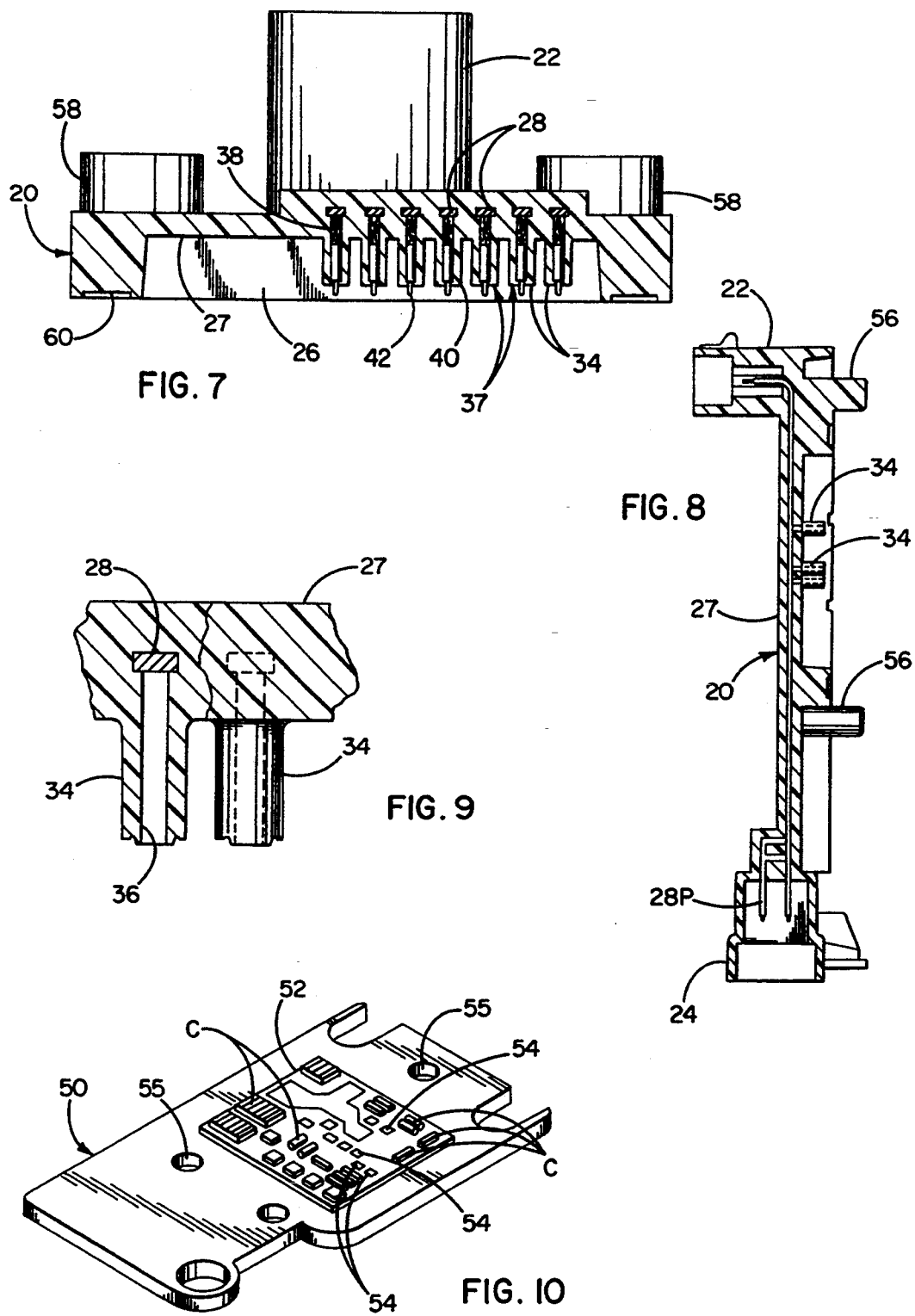

ELECTRICAL CONNECTORS

This invention relates to electrical connectors and particularly to electrical connector devices for making direct connections between a plurality of external conductors and the leads on a device which has exposed contact areas and adjacent components that extend above the contact areas, such as on a hybrid circuit or printed circuit board. The illustrated preferred embodiment is an engine control connector assembly for mounting and connecting a control circuit to an automotive engine.

BACKGROUND OF THE INVENTION

Hybrid circuits, integrated circuit chips, printed circuit boards and like devices, which will be referred to as circuits, often have discrete circuit components mounted on and extending above a major planar surface. Conductor traces disposed internally of the device or on its surface interconnect the components and provide access for connection to external circuit conductor leads. In various uses of such devices, a surface on which the components are mounted presents the most readily accessible area for joining external conductors. One example is in automotive engine connector devices wherein a control circuit or hybrid circuit is mounted on a heat sink plate. In the past, wire leads were soldered or welded to contact lugs provided on the front face of the control device, between upstanding circuit components, and to external connector leads in the connector device.

The soldered or welded connection techniques are tedious and expensive. For example, the soldered or welded connections are prone to failure during the manufacturing of the device and during the use of the device by the customer. These failures result in higher manufacturing costs due to rejects and in higher costs due to warranty claims and customer dissatisfaction. The failure or the reduction in the integrity of the soldered or welded connections can occur due to vibration, shock, thermal stress and mechanical stress. Furthermore, the manufacture and assembly of the devices, including the soldering or welding operation, is time consuming and expensive in comparison to the present invention.

In addition, the upstanding components on the exposed surfaces of such devices prevent impediments to application of alternative simplified connective techniques, e.g. such as are disclosed in U.S. Pat. Nos. 4,988,306, 4,992,053, 5,013,249 5,127,837.

It is an object of this invention to provide improved connector devices and connectors for effecting electrical connections with chips, circuits and boards bearing upstanding components as referred to above.

It is a further object of this invention to provide such connector devices and connectors by which such connections can be effected easily and inexpensively.

SUMMARY OF THE INVENTION

Electrical connector devices are provided for interconnecting external conductors with a connecting member such as a circuit which has upwardly projecting components that are adjacent contact areas on an exposed surface. The connector device comprises an insulator body for supporting a plurality of conductor elements in spaced relation to one another. The insulator body includes a plurality of cantilever hollow projections which have a length that exceeds the height of the components above the contact surfaces. The projections extend from the conductor sites generally parallel to one another and are disposed to mate the contact surfaces while providing spaces therearound to receive and accommodate the components. The insulator body preferably is a unitary molded body which includes the projections. An axially compressible conductive means extends through each of the hollow projections from the respective conductor site to an exposed end at the distal end of the respective projection. Preferably each compressible conductive means includes a wadded wire contact button and an exposed end plunger. Direct conductive connection between the external conductors and the contact surfaces of the connecting member are obtained by pressing the connector device and connecting member together with the projections aligned with the contact surfaces and the components being accommodated beside the projections.

Other objects and advantages of the invention will become apparent upon reading the following detailed description and appended claims, and upon reference to the accompanying drawings.

BRIEF DESCRIPTION OF THE DRAWINGS

FIG. 1 is a perspective view of an electrical connector employing teachings of this invention.

FIG. 2 is a perspective of the opposite side of the connector device of FIG. 1, with the cover plate and circuit removed.

FIGS. 3–6 are a top view, a left side view, a right side view and a bottom view of the connector device of FIG. 2, respectively.

FIG. 7 is an enlarged cross-sectional view taken on line 7—7 of FIG. 3.

FIG. 8 is an enlarged longitudinal cross-sectional view taken on irregular line 8—8 of FIG. 6, with the projection contacts omitted.

FIG. 9 is a further enlarged partial cross-sectional and side view of two adjacent contact projections generally as seen along line 7—7 in FIG. 3.

FIG. 10 is a perspective view of a cover plate and a circuit thereon for connecting with the device of FIG. 1.

FIG. 11 is an enlarged side view of a plunger contact element of the connector of FIG. 1.

DETAILED DESCRIPTION OF EMBODIMENTS OF THE INVENTION

Figure 12:
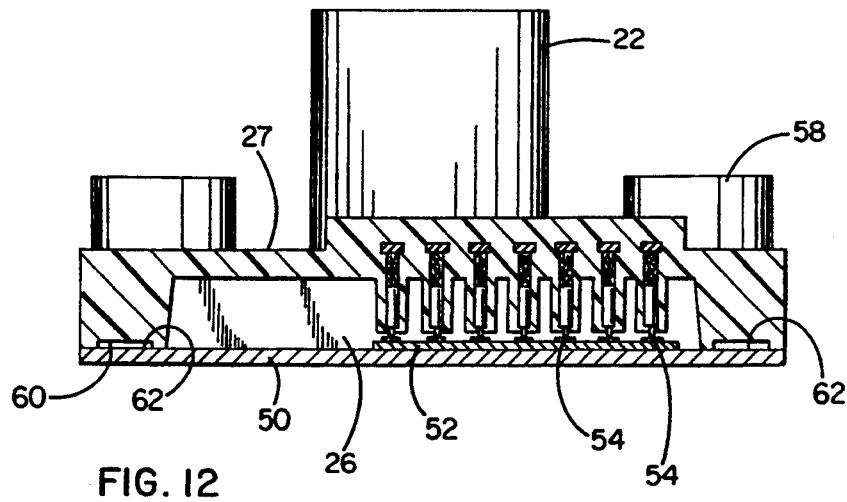
FIGS. 12 and 14 are cross-sectional views corresponding to FIGS. 7 and 8 respectively, each including the circuit and plate in position with a contact pad of the circuit beneath each of the plunger points.

Referring to the enclosed drawings, the connector device 16 includes basically a molded frame body 20 which includes a pair of sockets 22 and 24 and which forms a recess or a well 26 in one side of the body between these sockets. Several conductor strips 28, 30 form contact prongs 28p, 30p in the sockets 22 and 24 and extend to predetermined positions in the body wall 27 at the inner side of the recess 26. Other than the prong-ends 28p, 30p which are exposed for engagement with suitable plug-in types of circuit connectors that mate in the sockets 22, 24, the conductors 28, 30 are embedded in the molded body 20.

Within the well 26, the body 20 includes hollow cylindrical chimney-like projections 34 which extend parallel to one another from the wall 27. One of these projections is aligned with each of the conductors 28, 30. The body defines a bore, opening or aperture 36 which extends from the outer distal end of each of these projections to the respective conductor 28, 30, with the conductor being exposed at the inner end of that bore; see particularly FIGS. 9, 12, 13 and 14.

Figure 13:
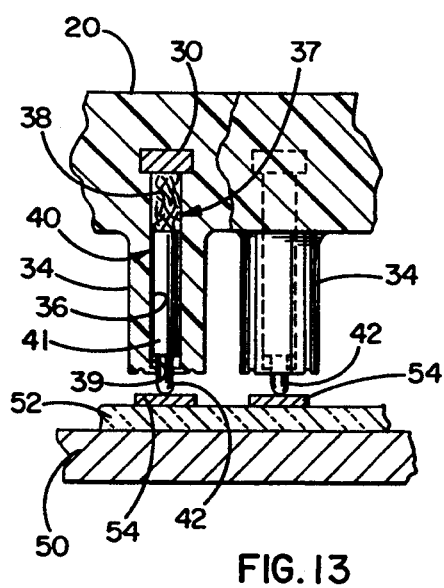
FIG. 13 is an enlarged partial cross-sectional view corresponding to FIG. 9, with the buttons and plungers in place, the end of the contact projections staked inward to retain the plungers and with the corresponding portions of the plate and circuit assembled thereagainst.
Figure 14:
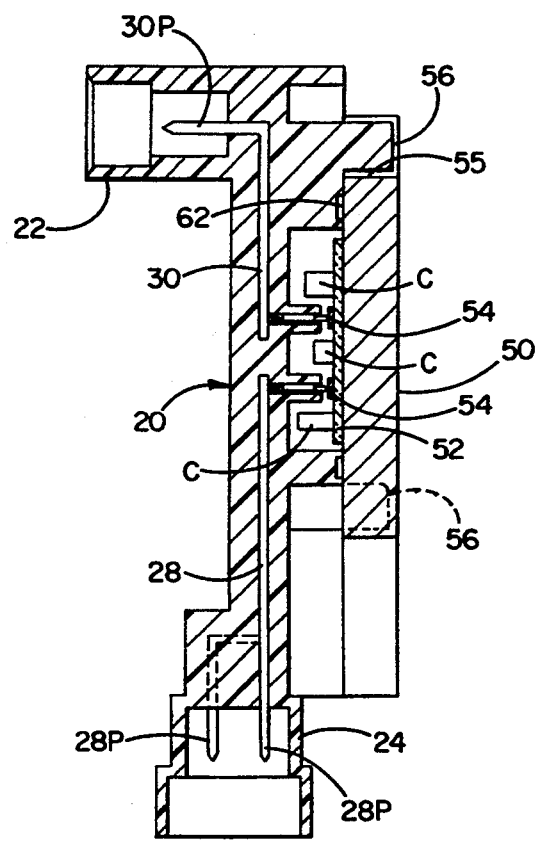

As further illustrated in FIGS. 11, 12, 13 and 14, an axially resilient button-plunger column contact 37, comprising a resilient wadded wire button 38 and a reciprocal plunger 40, is mounted in each of the bores 36. U.S. Pat. No. 5,127,837 further illustrates and describes contacts using similar combinations of resilient wire buttons and reciprocal plungers, and its disclosure thereof is incorporated herein by this reference. The buttons 38 and plungers 40 are mounted by insertion into the open ends of the bores 36. Then the outer ends of the projections are modified, as by cold-form staking inwardly, as at 39 in FIG. 13, to retain the larger body portion 41 of the plunger 40 in the respective bore 36 while permitting free passage of the smaller diameter end portion 42 as illustrated in FIGS. 12, 13 and 14. The buttons 38 and plungers 40 are sufficiently freely movable axially of the bores 36 such that the buttons 38 maintain contact with the adjacent surface of the respective conductor 28, 30 and with the inward end of the respective plunger 40 while permitting and providing resilient axial movement of each plunger within the ambit of axial movement corresponding generally to the length of the projecting end 42.

A metal mounting cover plate 50 as in FIG. 10 carries a circuit 52 adhered to its inward surface. The circuit 52 includes a number of electronic control components C and appropriate conductors (not shown) which connect those components to one another and to contact pads 54 exposed on the inward face of the circuit, among the electrical components C. The conductors of the circuit 52 may be traces on the surface or within laminations of the circuit. The location of the projections 34 carrying contacts 38, 40 are correlated to the location of the respective contact pads 54 such that each conductor 28, 30 is connected to the appropriate portion of the circuit 52 when the plate 50 is mounted on the housing 20 over the recess 26 with the circuit in appropriate registry. Because the projections 34 are of relative small cross-section, they can be and are appropriately located so as to traverse the recess 26 to the respective pad 54 without contacting or interfering with the various components C which extend from the circuit upwardly into the recess 26 beside and among the projections 34.

The metal cover plate 50 serves as a heat sink and transfer path. Slots or openings 55 mate with pins 56 on the body 20 for registration positioning of the plate 50 and particularly the attached circuit 52 relative to the projections 34. The pins 56 extend through the openings 55 and above the plate 50. The upper portions of the pins 56, which extend above the plate 50, are deformed by a staking process, a rolling process, a spinning process or another appropriate process in order to create a head on the upper portions of the pins 56. The deformation of the upper portions into a head secures the plate 50 and the body 20 together in mating relation. An annular shoulder surface 60 on the body 20, around the recess 26, provides a mating seat for the plate 50. A gasket material is applied to one or both of the mating face 62 of the plate or the body 20 on the shoulder surfaces 60 (FIGS. 12 and 14), to assist in providing a sealed joint therebetween. Securing means, such as screws or bolts, may be applied through openings 58 for mounting the assembled connector, as on an automotive engine. Appropriate circuit leads are attached through connectors that mate at the sockets 22, 24. Also, the recess 26 may be filled with a permanently soft potting compound for further sealing against humidity and environmental factors and to serve as a shock absorber to protect the various components against vibrations applied to the connector in use, such as when mounted on automobile engines.

The frame body 20 can be molded of a thermoplastic material. By way of one specific illustrative example, a frame body 20 is molded of thermoplastic glass reinforced polyester manufactured by Hoechest Celanese of 26 Main Street, Chatham, N.J., U.S.A. under compound number 3310. The body 20 was formed with a well 26 about 2 inches (51 mm) by about 2 inches (51 mm) in plan and about 0.200 inches (5 mm) deep. The inner wall 27 was about 0.200 inches (5 mm) thick, with the conductors 28, 30 approximately at its mid-plane as illustrated in FIGS. 7, 8 and 12-14. The side walls forming surfaces 60 were about 0.300 inches (7.5 mm) thick. The projections 34 were about 0.200 inches (5 mm) long and of about 0.100 inches (2.5 mm) outside diameter, with the apertures 36 being of circular cylindrical configuration of about 0.045 inches (1.1 mm) inside diameter and 0.280 inches (7 mm) length from the adjacent surface of the respective conductor 28, 30 to the distal end of the projection. The projections were spaced about 0.280 inches (7 mm) between rows.

The wadded buttons 38 were formed from Molybdenum wire of 0.002 in (0.05 mm) diameter, with each button being 0.110 inches (2.8 mm) in length and of 0.040 inches (1 mm) nominal outside diameter. Each plunger 40 was formed of brass and had a cylindrical main body 41 of about 0.041 inches (1 mm) outside diameter and about 0.200 inches (5 mm) long, with a central axial projection 42 of about 0.022 inches (0.5 mm) outside diameter and about 0.060 inches (1.5 mm) long.

The circuit 52 was about 1 inch (25 mm) by 1.75 inches (44.5 mm) and 0.040 inches (1 mm) thick with components C extending as much as about 0.100 inches (2.5 mm) from its contact surface which carried the contact pads 54. The circuit 52 was adhered to a planar plate 50 which was seated on the outer shoulders 60 of the well walls. The space between the rows of the projections 34 and the space therearound within the well 26 readily accommodated the components C when the contact pads 54 were seated against the resiliently retractable contact ends 42.

In the illustrated preferred embodiment the external conductor leads 28, 30 are molded in place in the body 20. However, it will be appreciated that the conductors may be separately applied, as by insertion in appropriate positioning cavities or channels on the rear wall 27 in registration with the projections 34. It also will be appreciated that the projections 34 may be located in any desired array according to the available locations of the contact surfaces 54 on the device to be connected. The pattern and locations of the external conductors 28, 30 should be correspondingly adjusted to place them in opposed relation to the respective contact surfaces 54, at the inward ends of the apertures 36.

Plunger-button contacts have been described as preferred for obtaining the desired axially compressive conductive contacts because of the wearability and ruggedness of the exposed plunger contact ends. However, other compressible contact core arrangements may be utilized in appropriate circumstances. For example, there may be a fixed core-piece extending from the conductor 28, 30 to the resilient contact column components, such as to the components 38, 40. Also, each resilient contact column may be a single elongated wadded wire button, or a button-slug-button arrangement or a plunger-button-plunger arrangement as in U.S. Pat. No. 4,988,306, 4,992,053 and 5,013,249 which are incorporated herein by this reference or other arrangements to provide the desirable resilient compressive and uniform conductive contact action.

It will be seen that electrical connector devices have been provided which meet the objects aforestated. While particular embodiments of the invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed is:

1. An electrical connector device for connecting with a mating connector member that has a mating face which includes generally planar conductive contact surfaces and components adjacent such contact surfaces which extend upwardly above such contact surfaces, said connector device comprising:
    a molded insulator body including a wall having a surface exposed toward a receiving position for supporting such a mating connector member in generally parallel spaced relation to said wall surface with such components therebetween, said insulator body defining conductor positions for a plurality of spaced electrically conductive members behind said wall surface and further including a plurality of projections which are aligned with said conductor positions and extend from said wall surface generally normal thereto a distance which exceeds the extension of such components above such contact surfaces of such a mating member;
    each of said projections and the respective adjacent portion of said wall defining an aperture extending from the respective conductor position to the distal end of said projection;
    electrically conductive contact means extending through each of said apertures and exposed at the distal end of the respective projection for contacting a conductive member in the respective conductor position while also contacting a contact surface adjacent said distal end, said electrically conductive contact means including a resiliently compressible element in each of said apertures which permits resilient compressive retraction of the conductive contact means at said distal end; and
    said projections being disposed in a predetermined array which corresponds to the array of the contact surfaces of such a mating connector member;
    whereby conductive members in said conductor positions are electrically connected to the contact surfaces of such a mating connector member through said projections and such upwardly extending components of said mating connector member are accommodated beside said projections.

2. The invention as in claim 1 including a plurality of electrically conductive members in said conductor positions.

3. The invention as in claim 2 wherein said electrically conductive members are embedded in said wall.

4. The invention as in claim 1 wherein said body includes electrical sockets and including electrically conductive members which extend from said sockets and traverse respective ones of said apertures.

5. The invention as in claim 4 wherein said body defines a well having an open side, said wall being at the bottom of said well and said projections extending from said wall toward said open side.

6. The invention as in claim 5 wherein said body defines a planar surface around the open side of said well.

7. The invention as in claim 6 wherein the distal ends of said projections are within said well, between said wall surface and said planar surface.

8. The invention as in claim 1 wherein each of said electrically conductive contact means includes a wadded wire button element having one end exposed for abutting such an electrically conductive member in the respective conductor position and a plunger element abutting the other end of said wadded wire button element and extending from said distal end of the respective projection, said plunger element being resiliently reciprocal along the respective aperture by the resilient spring action of said wadded wire button element for yieldable compressive engagement with an adjacent contact surface.

9. The invention as in claim 1 wherein said body includes support sections defining said receiving position, said support sections and said projections being spaced from one another for accommodating the upwardly extending components of said mating connector member therebetween.

10. The invention as in claim 9 wherein said support sections form side walls of said recess.

11. The invention as in claim 10 wherein said side walls are unitary with said wall of said body.

12. The invention as in claim 1 wherein said body defines a recess with said wall surface forming the inner end of said recess, said projections extending into said recess from said wall surface.

13. An electrical connector combination comprising:
    a connector member having a mating face that includes generally planar conductive contact surfaces and components adjacent such contact surfaces, said components extending upwardly above said contact surfaces; and
    a molded insulator body including a wall having a surface exposed toward a receiving position for supporting said connector member in generally parallel spaced relation to said wall surface with said components therebetween, said insulator body defining conductor positions for supporting a plurality of spaced electrically conductive members behind said wall surface and further including a plurality of projections which are aligned with said conductor positions and extend from said wall surface generally normal thereto a distance which exceeds the extension of said components above such contact surfaces of said connector member;

each of said projections and the respective adjacent portion of said wall defining an aperture extending from the respective conductor position to the distal end of said projection;

electrically conductive contact means extending through each of said apertures and exposed at the distal end of the respective projection for contacting a conductive member in the respective conductor position while contacting one of said contact surfaces adjacent said distal end, said electrically conductive contact means including a resiliently compressive element in each of said apertures which permits resilient compressive retraction of the conductive contact means at said distal end; and said projections being disposed in a predetermined array which corresponds to the array of the contact surfaces of said connector member;

whereby conductive members in said conductor positions are electrically connected to the contact surfaces of said connector member through said projections and said upwardly extending components of said connector member are accommodated beside said projections.

14. An automotive control device comprising an electrical connector combination as in claim 13 wherein said connector member is an automotive engine control circuit.

15. The invention as in claim 14 wherein said circuit is mounted on a metal heat conductive plate, said body and said plate having cooperative seating means for joining said plate and said body with said contact surfaces of said connector member in compressive registered relation with contact means at the distal ends of said projections.

16. The invention as in claim 13 including a plurality of electrically conductive members in said conductor positions.

17. The invention as in claim 16 wherein said electrically conductive members are embedded in said wall.

18. The invention as in claim 13 wherein said body includes electrical sockets and including electrically conductive members which extend from said sockets and traverse respective ones of said apertures.

19. The invention as in claim 18 wherein said body defines a well having an open side, said wall being at the bottom of said well and said projections extending from said wall toward said open side.

20. The invention as in claim 19 wherein said body defines a planar surface around the open side of said well.

21. The invention as in claim 20 wherein the distal ends of said projections are within said well, between said wall surface and said planar surface.

22. The invention as in claim 13 wherein each of said electrically conductive contact means includes a wadded wire button element having one end exposed for abutting such an electrically conductive member in the respective conductor position and a plunger element abutting the other end of said wadded wire button element and extending from said distal end of the respective projection, said plunger element being resiliently reciprocal along the respective aperture by the resilient spring action of said wadded wire button element for yieldable compressive engagement with an adjacent contact surface.

23. The invention as in claim 13 wherein said body includes support sections defining said receiving position, said support sections and said projections being spaced from one another for accommodating the upwardly extending components of said mating connector member therebetween.

24. The invention as in claim 23 wherein said support sections form side walls of said recess.

25. The invention as in claim 24 wherein said side walls are unitary with said wall of said body.

26. The invention as in claim 13 wherein said body defines a recess with said wall surface forming the inner end of said recess, said projections extending into said recess from said wall surface.

* * * * *

UNITED STATES PATENT AND TRADEMARK OFFICE
CERTIFICATE OF CORRECTION

PATENT NO. : 5,382,169
DATED : January 17, 1995
INVENTOR(S) : William R. Bailey, et al.

It is certified that error appears in the above-indentified patent and that said Letters Patent is hereby corrected as shown below:

Column 1, line 48, delete "prevent" and substitute therefor --present--

Signed and Sealed this

Ninth Day of May, 1995

Attest:

Attesting Officer

BRUCE LEHMAN

Commissioner of Patents and Trademarks